United States Patent
Gu (10) Patent No.: US 12,427,444 B2
(45) Date of Patent: Sep. 30, 2025

(54) DEFOAMER ACTIVE, MANUFACTURING THEREOF, AND DEFORMING FORMULATION

(71) Applicant: W.R. Grace & Co.-Conn., Columbia, MD (US)

(72) Inventor: Feng Gu, Columbia, MD (US)

(73) Assignee: W.R. Grace & Co.-Conn., Columbia, MD (US)

( * ) Notice: Subject to any disclaimer, the term of this patent is extended or adjusted under 35 U.S.C. 154(b) by 756 days.

(21) Appl. No.: 17/251,891

(22) PCT Filed: Jun. 13, 2019

(86) PCT No.: PCT/US2019/036941
§ 371 (c)(1),
(2) Date: Dec. 14, 2020

(87) PCT Pub. No.: WO2019/241498
PCT Pub. Date: Dec. 19, 2019

(65) Prior Publication Data
US 2021/0316232 A1 Oct. 14, 2021

Related U.S. Application Data

(60) Provisional application No. 62/685,358, filed on Jun. 15, 2018.

(51) Int. Cl.
| | | |
|---|---|---|
| *B01D 19/04* | (2006.01) | |
| *C09C 1/30* | (2006.01) | |
| *C09D 7/40* | (2018.01) | |
| *C09D 7/62* | (2018.01) | |
| *C08K 3/36* | (2006.01) | |
| *C08K 9/06* | (2006.01) | |

(52) U.S. Cl.
CPC ........ *B01D 19/0409* (2013.01); *C09C 1/3018* (2013.01); *C09C 1/3081* (2013.01); *C09C 1/309* (2013.01); *C09D 7/62* (2018.01); *C09D 7/69* (2018.01); *C01P 2004/61* (2013.01); *C01P 2006/12* (2013.01); *C08K 3/36* (2013.01); *C08K 9/06* (2013.01); *C08K 2201/005* (2013.01); *C08K 2201/006* (2013.01)

(58) Field of Classification Search
None
See application file for complete search history.

(56) References Cited

U.S. PATENT DOCUMENTS

| | | |
|---|---|---|
| 3,076,768 A | 2/1963 | Boylan |
| 3,207,698 A | 9/1965 | Liebling |
| 3,408,306 A | 10/1968 | Boylan |
| 3,573,222 A | 3/1971 | Harrison, Jr. |
| 3,634,288 A | 1/1972 | Youngs |
| 3,714,068 A | 1/1973 | Miller et al. |
| 4,008,173 A | 2/1977 | Davis |
| 4,072,796 A | 2/1978 | Helmut et al. |
| 4,247,708 A | 1/1981 | Tsutsumi et al. |
| 4,377,493 A | 3/1983 | Boylan et al. |
| 4,406,817 A | 9/1983 | Muller |
| 4,416,790 A | 11/1983 | Lochner |
| 4,443,359 A * | 4/1984 | Shimizu ............. B01D 19/0409 516/120 |
| 4,594,109 A | 6/1986 | Kawabata |
| 4,640,882 A | 2/1987 | Mitsuhashi et al. |
| 4,655,960 A * | 4/1987 | Wuhrmann ............ B01D 19/04 516/120 |
| 4,671,955 A | 6/1987 | Palinczar |
| 4,919,843 A | 4/1990 | Innertsberger et al. |
| 5,049,532 A | 9/1991 | Brooks et al. |
| 5,082,652 A | 1/1992 | Mayfield et al. |
| 5,215,759 A | 6/1993 | Mausner |
| 5,215,849 A | 6/1993 | Makuta et al. |
| 5,234,787 A | 8/1993 | Morimoto et al. |
| 5,256,196 A | 10/1993 | Chjonowski et al. |
| 5,288,314 A | 2/1994 | Howard et al. |
| 5,294,426 A | 3/1994 | Sekine et al. |
| 5,357,636 A | 10/1994 | Dresdner, Jr. et al. |
| 5,366,645 A | 11/1994 | Sobottka |

(Continued)

FOREIGN PATENT DOCUMENTS

| | | |
|---|---|---|
| CN | 1131434 A | 9/1996 |
| DE | 1767850 A1 | 4/1971 |

(Continued)

OTHER PUBLICATIONS

Marinova et al., "Optimal Hydrophobicity of Silica in Mixed Oil-Silica Antifoams", Langmuir, v 18, n 9, p. 3399-3403, Apr. 30, 2002; ISSN: 07437463; DOI: 10.1021/la0115841; Publisher: American Chemical Society, http://pubs.acs.org/doi/abs/10.1021/la0115841.

Marinova et al., "Model Studies of the Effect of Silica Hydrophobicity on the Efficiency of Mixed Oil-Silica Antifoams", Langmuir, v 18, n 23, p. 8761-8769, Nov. 12, 2002; ISSN: 07437463; DOI: 10.1021/la025675p; Publisher: American Chemical Society, http://pubs.acs.org/doi/abs/10.1021/la025675p.

Patterson, "Influence of silica properties on performance of antifoams in pulp and paper applications 2. In-situ hydrophobing", Colloids and Surfaces A: Physicochemical and Engineering Aspects, v 74, n 1, p. 115-126, Jul. 6, 1993; ISSN: 09277757; DOI: 10.1016/0927-7757(93)80403-2, https://www.sciencedirect.com/science/article/bii/0927775793804032.

(Continued)

*Primary Examiner* — Tae H Yoon
(74) *Attorney, Agent, or Firm* — DORITY & MANNING, P.A.

(57) ABSTRACT

This invention relates to a defoamer active. The defoamer active may include hydrophobized silica particles obtained by treating silica particles with a hydrophobilizing agent. The silica particles may have a BET surface of less than about 150 m$^2$/g, a surface pH of at least about 10, and a median particle size ranging from about 2 μm to about 50 μm. The carbon content of the hydrophobized silica particles may not be more than 3%.

15 Claims, 2 Drawing Sheets

(56) References Cited

U.S. PATENT DOCUMENTS

| | | |
|---|---|---|
| 5,368,608 A | 11/1994 | Evy et al. |
| 5,378,676 A | 1/1995 | Defieuw et al. |
| 5,407,958 A | 4/1995 | Heath et al. |
| 5,431,852 A | 7/1995 | Kaijou |
| 5,486,306 A | 1/1996 | L'Hostis et al. |
| 5,486,420 A | 1/1996 | Nishihara et al. |
| 5,523,019 A | 6/1996 | Kim |
| 5,531,929 A | 7/1996 | Kobayashi |
| 5,575,950 A | 11/1996 | Steelman |
| 5,674,938 A | 10/1997 | Rautschek et al. |
| 5,686,054 A | 11/1997 | Barthel et al. |
| 5,773,407 A | 6/1998 | Lai et al. |
| 5,776,573 A | 7/1998 | Trotter et al. |
| 5,824,739 A | 10/1998 | Kondo et al. |
| 5,843,335 A | 12/1998 | Kurono et al. |
| 5,861,453 A | 1/1999 | Datz-Siegel et al. |
| 5,916,090 A | 6/1999 | Itagaki et al. |
| 5,989,524 A | 11/1999 | Dromard et al. |
| 6,045,814 A | 4/2000 | Roulier et al. |
| 6,090,439 A | 7/2000 | Menon et al. |
| 6,136,917 A | 10/2000 | Christiano et al. |
| 6,191,122 B1 | 2/2001 | Lux et al. |
| 6,197,384 B1 | 3/2001 | Schubert et al. |
| 6,200,509 B1 | 3/2001 | Neubauer et al. |
| 6,207,722 B1 | 3/2001 | Juen et al. |
| 6,291,063 B1 | 9/2001 | Shah et al. |
| 6,303,663 B1 | 10/2001 | Broadbent et al. |
| 6,512,015 B1 | 1/2003 | Elms et al. |
| 6,605,183 B2 | 8/2003 | Rautschek et al. |
| 6,656,975 B1 | 12/2003 | Christiano et al. |
| 6,887,518 B2 | 5/2005 | Barthel et al. |
| 6,899,951 B2 | 5/2005 | Panz et al. |
| 6,956,080 B2 | 10/2005 | Scholz et al. |
| 7,022,375 B2 | 4/2006 | Schachtely et al. |
| 7,074,457 B2 | 7/2006 | Panz et al. |
| 7,084,193 B2 | 8/2006 | Jackson et al. |
| 7,220,449 B2 | 5/2007 | Schachtely et al. |
| 7,253,224 B2 | 8/2007 | Mohnot et al. |
| 7,455,847 B1 | 11/2008 | Brown |
| 7,776,929 B2 | 8/2010 | Schneider et al. |
| 8,007,751 B2 | 8/2011 | Panz et al. |
| 8,017,098 B2 | 9/2011 | Uhrlandt et al. |
| 8,053,480 B2 | 11/2011 | Hilberer et al. |
| 8,293,834 B2 | 10/2012 | Meyer et al. |
| 8,361,622 B2 | 1/2013 | Gottschalk-Gaudig et al. |
| 8,530,401 B2 | 9/2013 | Becker et al. |
| 8,614,256 B2 | 12/2013 | Panz et al. |
| 8,658,816 B2 | 2/2014 | Wehmeier et al. |
| 9,095,787 B2 | 8/2015 | Panandiker et al. |
| 9,114,333 B2 | 8/2015 | Burger et al. |
| 9,133,421 B2 | 9/2015 | Panandiker et al. |
| 9,278,298 B2 | 3/2016 | Takewaki et al. |
| 9,404,068 B2 | 8/2016 | Sakurai et al. |
| 9,487,736 B2 | 11/2016 | Gallez et al. |
| 9,527,874 B2 | 12/2016 | Gottschalk-Gaudig et al. |
| 9,624,318 B2 | 4/2017 | Benner et al. |
| 9,669,332 B2 | 6/2017 | Wilson et al. |
| 2001/0014714 A1 | 8/2001 | Amarasekera et al. |
| 2002/0004026 A1 | 1/2002 | Ishibashi et al. |
| 2002/0025333 A1 | 2/2002 | Agostini et al. |
| 2003/0035888 A1 | 2/2003 | Eriyama |
| 2003/0100631 A1 | 5/2003 | Barthel et al. |
| 2003/0114542 A1 | 6/2003 | Mohnot et al. |
| 2003/0138715 A1 | 7/2003 | Barthel et al. |
| 2003/0144404 A1 | 7/2003 | Schachtely et al. |
| 2003/0152540 A1 | 8/2003 | Putman et al. |
| 2003/0161805 A1 | 8/2003 | Schlossman et al. |
| 2003/0190295 A1 | 10/2003 | Fukui et al. |
| 2003/0228334 A1 | 12/2003 | Mercier et al. |
| 2004/0047826 A1 | 3/2004 | Brown |
| 2004/0110077 A1 | 6/2004 | Yachi et al. |
| 2004/0131527 A1 | 7/2004 | Gottschalk-Gaudig et al. |
| 2004/0186224 A1 | 9/2004 | Minemura et al. |
| 2005/0002973 A1 | 1/2005 | Johansson et al. |
| 2005/0008667 A1 | 1/2005 | Liechty et al. |
| 2005/0026089 A1 | 2/2005 | Ogawa et al. |
| 2005/0112072 A1 | 5/2005 | Wang et al. |
| 2005/0186235 A1 | 8/2005 | Martin et al. |
| 2005/0192395 A1 | 9/2005 | Panz et al. |
| 2005/0282022 A1 | 12/2005 | Christian et al. |
| 2006/0011219 A1 | 1/2006 | Korth et al. |
| 2006/0067868 A1 | 3/2006 | Kutsovsky |
| 2006/0081012 A1 | 4/2006 | Park et al. |
| 2006/0100165 A1 | 5/2006 | Manetta et al. |
| 2006/0110542 A1 | 5/2006 | Dietz et al. |
| 2006/0134423 A1 | 6/2006 | Malet et al. |
| 2006/0150527 A1 | 7/2006 | Ohara et al. |
| 2006/0204528 A1 | 9/2006 | Nolte et al. |
| 2006/0241222 A1 | 10/2006 | Chaussade et al. |
| 2007/0065463 A1 | 3/2007 | Aung-Din |
| 2007/0089246 A1 | 4/2007 | Brun |
| 2007/0112078 A1 | 5/2007 | Procter et al. |
| 2007/0154439 A1 | 7/2007 | Dorf |
| 2007/0253989 A1 | 11/2007 | Abe et al. |
| 2008/0017339 A1 | 1/2008 | Zhang et al. |
| 2008/0131597 A1 | 6/2008 | Takehara et al. |
| 2008/0159974 A1 | 7/2008 | Harripersad |
| 2008/0167390 A1 | 7/2008 | Archer et al. |
| 2008/0269358 A1 | 10/2008 | Inoue et al. |
| 2008/0299158 A1 | 12/2008 | Kishida et al. |
| 2009/0137446 A1 | 5/2009 | Rautschek et al. |
| 2009/0185984 A1 | 7/2009 | Gutkowski et al. |
| 2009/0229776 A1 | 9/2009 | Zhang et al. |
| 2009/0304617 A1 | 12/2009 | Banowski et al. |
| 2009/0324506 A1 | 12/2009 | Seidling et al. |
| 2010/0003182 A1 | 1/2010 | Costa et al. |
| 2010/0009277 A1 | 1/2010 | Ogawa et al. |
| 2010/0025373 A1 | 2/2010 | Barthel et al. |
| 2010/0166852 A1 | 7/2010 | Mallard et al. |
| 2010/0196243 A1 | 8/2010 | Meyer et al. |
| 2010/0233059 A1 | 9/2010 | Meyer et al. |
| 2010/0286311 A1 | 11/2010 | Meyer et al. |
| 2011/0033413 A1 | 2/2011 | Kwetkat et al. |
| 2011/0033555 A1 | 2/2011 | Kwetkat et al. |
| 2011/0039753 A1 | 2/2011 | Cauvin et al. |
| 2011/0073689 A1 | 3/2011 | Paulat et al. |
| 2011/0172343 A1 | 7/2011 | Panz et al. |
| 2011/0250250 A1 | 10/2011 | Kishida et al. |
| 2012/0064345 A1 | 3/2012 | Gini |
| 2012/0080157 A1 | 4/2012 | Rosencrance et al. |
| 2012/0277378 A1 | 11/2012 | Nelson et al. |
| 2012/0288700 A1 | 11/2012 | McMullin et al. |
| 2013/0004443 A1 | 1/2013 | Norman |
| 2013/0079419 A1 | 3/2013 | Zhang et al. |
| 2013/0135838 A1 | 5/2013 | Tsukao et al. |
| 2013/0174477 A1 | 7/2013 | Sivasubramanian et al. |
| 2013/0204029 A1 | 8/2013 | Hille |
| 2014/0004166 A1 | 1/2014 | Cunningham et al. |
| 2014/0308608 A1 | 10/2014 | Veregin et al. |
| 2014/0316015 A1 | 10/2014 | Burger et al. |
| 2014/0364515 A1 | 12/2014 | Zeng et al. |
| 2015/0011489 A1 | 1/2015 | Jacovella |
| 2015/0290113 A1 | 10/2015 | Kim et al. |
| 2015/0306124 A1 | 10/2015 | Manetta et al. |
| 2015/0368440 A1 | 12/2015 | Scholz et al. |
| 2016/0008245 A1 | 1/2016 | Durkee et al. |
| 2016/0154331 A1 | 6/2016 | Tanaka et al. |
| 2016/0158263 A1 | 6/2016 | Jacovella et al. |
| 2016/0184342 A1 | 6/2016 | Jacovella et al. |
| 2016/0228550 A1 | 8/2016 | Karp et al. |
| 2016/0304635 A1 | 10/2016 | Tu et al. |
| 2017/0121629 A1 | 5/2017 | Xu et al. |
| 2017/0144124 A1 | 5/2017 | Nejand et al. |
| 2017/0209813 A1 | 7/2017 | Kobayashi et al. |
| 2017/0210913 A1 | 7/2017 | Dubey et al. |
| 2017/0218312 A1 | 8/2017 | Panandiker et al. |
| 2017/0312657 A1 | 11/2017 | Shimabayashi et al. |

FOREIGN PATENT DOCUMENTS

| | | |
|---|---|---|
| DE | 2125948 A1 | 12/1971 |
| DE | 10252757 A1 | 6/2004 |
| DE | 102004043447 A1 | 3/2006 |
| DE | 102005029777 A1 | 1/2007 |

(56) References Cited

FOREIGN PATENT DOCUMENTS

| | | |
|---|---|---|
| DE | 102005051869 A1 | 4/2007 |
| DE | 102006004957 A1 | 8/2007 |
| DE | 102006021780 A1 | 11/2007 |
| EP | 0008613 A1 * | 3/1980 |
| EP | 0421333 A1 | 4/1991 |
| EP | 0531421 A1 | 3/1993 |
| EP | 0608989 A2 | 8/1994 |
| EP | 0716870 A1 | 6/1996 |
| EP | 0663225 B1 | 11/1998 |
| EP | 1047733 A1 | 11/2000 |
| EP | 0726086 B1 | 5/2003 |
| EP | 0927567 B1 | 6/2004 |
| EP | 1518533 A2 | 3/2005 |
| EP | 1789719 A2 | 5/2007 |
| EP | 1419823 B1 * | 8/2007 |
| EP | 2266527 A2 | 12/2010 |
| EP | 2293934 A1 | 3/2011 |
| EP | 3210663 A1 | 8/2017 |
| FR | 2854324 A1 | 11/2004 |
| FR | 2970172 A1 | 7/2012 |
| GB | 1089890 A | 11/1967 |
| JP | S51-014900 A | 2/1976 |
| JP | S58-208124 A | 12/1983 |
| JP | H10-007415 A | 1/1998 |
| JP | 2005-231990 A | 9/2005 |
| JP | 2011-072993 A | 4/2011 |
| JP | 4664511 B2 * | 4/2011 |
| JP | 2015-506264 A | 3/2015 |
| JP | 2016-113305 A | 6/2016 |
| MX | 2013005263 A | 6/2013 |
| WO | 9510564 A1 | 4/1995 |
| WO | 2003029338 A1 | 4/2003 |
| WO | 2007119993 A1 | 10/2007 |
| WO | 2015121363 A1 | 8/2015 |
| WO | 2016093156 A1 | 6/2016 |
| WO | 2016093221 A1 | 6/2016 |
| WO | 2016117344 A1 | 7/2016 |
| WO | 2016142404 A1 | 9/2016 |
| WO | 2019241498 A1 | 12/2019 |
| WO | 2019241501 A1 | 12/2019 |

OTHER PUBLICATIONS

Chang et al., "Synthesis of(AB)_n Polyether-block-polysiloxanes and Its Application in Defoaming Agent", Fine Chemicals/Jingxi Huagong vol. 29, Iss. 7, (Jul. 15, 2012): 651-655,664.

Marinova et al., "Hydrophobization of Glass Surface by Adsorption of Poly(dimethylsiloxane)", Langmuir, 2005, v 21, n. 25, p. 11729-11737, DOI: 10.1021/la051690t, Publication Date (Web): Oct. 25, 2005, http://pubs.acs.org/doi/abs/10.1021/la051690t.

Foreign Action other than Search Report on CN patent appl. No. 201980039999.1 dated Jun. 21, 2022.

Foreign Office Action on JP patent application No. 2020-569805 dated Apr. 3, 2023, 17 pages.

Boger, David, "5. Fluid Mechanics", Ullmann's Encyclopedia of Industrial Chemistry, vol. B1, 2023, 52 pages.

Nied, Roland, "17. Air Classifying", Ullmann's Encyclopedia of Industrial Chemistry, vol. B2, 2023, 19 pages.

* cited by examiner

DEFOAMER ACTIVE, MANUFACTURING THEREOF, AND DEFORMING FORMULATION

This application is being filed as the U.S. national stage patent application of PCT International Patent Application No. PCT/US2019/036941, filed on 13 Jun. 2019 and entitled "DEFOAMER ACTIVE, MANUFACTURING THEREOF, AND DEFORMING FORMULATION," which claims priority to U.S. Provisional Patent Application Ser. No. 62/685,358 filed on 15 Jun. 2018 and entitled "DEFOAMER ACTIVE, MANUFACTURING THEREOF, AND DEFORMING FORMULATION," the content of both of which is incorporated herein by reference in its entirety.

FIELD OF THE INVENTION

The present invention relates to a defoaming technology, and more particularly, to a defoamer active, a manufacturing method thereof, and a defoaming formulation.

BACKGROUND

Hydrophobically treated silicas or other inorganic particles have been used as defoamer actives in many areas including the paper industry, paint and coating formulations. Defoamer actives are used especially in waterborne systems to reduce and eliminate microbubbles or foams. Typically, silica particles are chemically bonded with silicone oil (polydimethylsiloxane or PDMS) to produce hydrophobically treated particles, which are then used as defoamer actives. In 1963, Hercules Powder Company first patented a main defoaming composition in U.S. Pat. No. 3,076,768. The same company also patented a process of bonding 10-15 wt % of silicone oil or PDMS on silica by spraying the silicone oil onto silica and then heating the two together (U.S. Pat. No. 3,408,306).

U.S. Pat. No. 3,207,698 discloses defoaming composition comprising hydrophobic precipitated silicas having a surface pH of from about 8 to about 10, an average particle diameter of about 0.005 to 0.050 micron, and a surface area of about 200 to 400 square meters per gram.

U.S. Pat. No. 3,714,068 discloses improved fine silicas with a modified surface. The surface may be modified by controlling pH of the silica slurry to be between about 1.5 and 12, and permanently affixing 6 to 20% of a siloxane or silane based on a weight of the silica. The surface may be further controlled by varying composition of a water layer on the surface of the silica and controlling the choice and curing of the silicone and/or silica. An improved defoamer active for aqueous systems is then formed by compounding 3 to 30% of the improved hydrophobic silica having about 2.5 to about 8% of $Na_2O$ and a surface area of less than about 175 $m^2/g$ with an organic hydrocarbon liquid, which has a viscosity of from about 10 to 3000 cps.

U.S. Pat. No. 8,614,256 discloses a hydrophobic precipitated silica having a BET surface of less than 110 $m^2/g$, a CTAB of less than 150 $m^2/g$, a BET/CTAB ratio of less than 3, a carbon content of greater than 3.1%, a pH of 9.7 to 10.5, a DBP of less than 230 g/(100 g), and a methanol wettability of more than 50%. The hydrophobic precipitated silica is used in compositions including defoamers, silicone rubber and HTV crosslinkable silicone rubber compositions. The hydrophobic precipitated silica is also useful as a flow assistant, a carrier or an anti-blocking agent.

Two conventional methods heretofore used to render a hydrophilic silica hydrophobic by surface treatment with a silicone fluid include the "in-situ" and the "dry roast" methods. Both methods are disclosed and described in U.S. Pat. No. 5,575,950, herein incorporated by reference. However, these methods may be disadvantageous due to process inefficiency and high associated costs.

For example, due to its very low surface tension or energy, when silicone oils are used as the hydrophobic agent, free, unreacted silicone oils can quickly spread to many surrounding surfaces. This phenomenon maybe detrimental to many aqueous systems. For example, in automobile paint systems, free silicone oil, especially the low molecular and very fluid silicone oils, has the tendency of overspreading all over the place and accordingly contaminating production halls from floor to ceiling. The free silicone oil can disrupt adhesion of paints and glues, cause foams to shrink, and generate paint defects sometimes referred as "fish eyes." Therefore, in both aforementioned processes (i.e., in situ and dry roast), long reaction time is often required to ensure that the free, unreacted and physically adsorbed silicone oil levels are at minimal. Such long reaction times have shortcomings such as poor process efficiency with high cost.

Furthermore, the in situ and dry roast processes are typically batch processes and not continuous ones, thereby further limiting production cycles within a given time period.

Thus, there is a need to provide improved hydrophobized silica particles and a process of preparing the same, which is quick, efficient and more cost effective. BRIEF SUMMARY The present invention discloses that silica particles having a high surface pH in combination with a low surface area unexpectedly provide enhanced reactivity to bond silanol terminated PDMS, especially the silanol terminated PDMS having a high molecular weight or viscosity. This high reactivity has unexpected advantage, for example, of significantly shortening the reaction time, thereby enabling the reaction to be carried out in a continuous mode as opposed to a batch process, which may require long reaction time. Furthermore, less mount of PDMS may be needed to obtain hydrophobized particles with excellent hydrophobicity. Accordingly, the hydrophobized silica particles have unexpectedly low carbon content as well as excellent hydrophobicity performance.

Accordingly, one embodiment of the present invention is a defoamer active. The defoamer active may include hydrophobized silica particles obtained by treating silica particles with a hydrophobilizing agent. The silica particles may have a BET surface of less than about 150 $m^2/g$, a surface pH of at least about 10, and a median particle size ranging from about 2 µm to about 50 µm. A carbon content of the hydrophobized silica particles may not be more than 3%. The hydrophobilizing agent may be silanol terminated polydimethylsiloxane having an average molar molecular weight of at least 2,000 Dalton (Da).

Another embodiment of the present invention is a method of forming a defoamer active. The method may include high energy milling and/or bonding silica particles having a median particle size ranging from about 2 µm to about 50 µm with a hydrophobilizing agent in a high energy milling apparatus, which may include a spiral jet mill or fluid energy mill, to obtain hydrophobized silica particles.

The hydrophobized silica particles may have a median particle size ranging from about 2 µm to about 15 µm.

BRIEF DESCRIPTION OF THE DRAWINGS

The subject matter which is regarded as the disclosure is particularly pointed out and distinctly claimed in the claims at the conclusion of the specification. The foregoing and other objects, features, and advantages of the disclosure are apparent from the following detailed description taken in conjunction with the accompanying drawings in which:

DETAILED DESCRIPTION

The present disclosure will be described in further detail with reference to the accompanying drawings and embodiments in order to provide a better understanding by those skilled in the art of the technical solutions of the present disclosure. Throughout the description of the present disclosure, reference is made to FIGS. 1 and 2.

The following terms, used in the present description and the appended claims, have the following definition.

A numerical range modified by "about" herein means that the upper and lower limits of the numerical range can vary by 10% thereof. A numerical value modified by "about" herein means that the numerical value can vary by 10% thereof.

The term "hydrophobized" is used herein to indicate silica particles having a hydrophobicity rating of at least 2.0 on a scale range of 0 to 3.0, as measured according to a floatability method in a mixture solvent of methanol and water with a volume ratio of 60% to 40%.

One example of the present invention is a defoamer active. The defoamer active may include hydrophobized silica particles obtained by treating silica particles with a hydrophobilizing agent. The silica particles may have a BET surface of less than about 150 $m^2/g$, a surface pH of at least about 10, and a median particle size ranging from about 2 μm to about 50 μm. A carbon content of the hydrophobized silica particles may not be more than 3.0%.

A median particle size of the hydrophobized silica particles may range from about 2 μm to about 15 μm, preferably about 4 μm to about 12 μm.

In one embodiment, a surface pH of the silica particles is at least about 10. The surface pH of the silica particles typically ranges from about 10 to about 12. In one embodiment, a BET surface of the silica particles is less than about 100 $m^2/g$, preferably less than about 60 $m^2/g$. In one embodiment, the carbon content of the hydrophobized silica particles is not more than 2.0%.

In one embodiment, the silica particles may have a median particle size ranging from about 2 μm to about 30 μm, preferably from about 4 μm to about 15 μm.

The hydrophobilizing agent may be a silicone compound such as polydimethylsiloxane (PDMS or silicone oil), polymethylhydrogensiloxane, or polymethylphenylsiloxane.

In an embodiment of the present invention, the silicone compound is polydimethylsiloxane. The polydimethylsiloxane may have an average molar mass of at least about 2,000 Dalton (Da), preferably ranging from about 3,000 Da to about 50,000 Da, more preferably ranging from about 5,000 Da to 30,000 Da. The polydimethylsiloxane may be a silanol terminated polydimethylsiloxane. The silanol terminated polydimethylsiloxane may have a content of hydroxyl group of at least about 0.001% by weight, preferably ranging from about 0.01% by weight to about 2.0% by weight, more preferably ranging from about 0.1% by weight to about 1.8% by weight. In one embodiment, the silanol terminated polydimethylsiloxane has a viscosity of at least about 50 centipoises, preferably ranging from about 100 centipoises to about 5000 centipoises, more preferably ranging from about 200 centipoises to 3000 centipoises.

The carbon content of the hydrophobized silica particles is not more than about 3.00%, preferably not more than about 2.5%, more preferably from about 1.0% to about 2.0%.

Typically, the total amount of hydrophobilizing agent present in the hydrophobized silica particles is an amount of no greater than about 8% by weight, preferably no greater than about 7% by weight, based on a total weight of the hydrophobized silica particles. In one embodiment, the amount of the hydrophobilizing agent present on the hydrophobized particles ranges from about 3 to about 7 wt %, preferably about 4 to about 6 wt %, based on a total weight of the hydrophobized silica particles.

The hydrophobized silica particles may have hydrophobicity rating of at least 2, as measured according to a floatability method in a mixture solvent of methanol and water with a volume ratio of 60% to 40%. Preferably, the hydrophobicity rating ranges from about 2 to about 3.

The hydrophobized silica particles may be prepared using a conventional batch method or a continuous process. In either a batch or continuous process, it is preferable to conduct the process in a manner such that at least about 90% by weight, preferably at least about 95% by weight, of the hydrophobilizing agent that is used in the process are covalently bonded to the final hydrophobized silica particles. This ensures that any free unreacted silicone oil levels are kept at a minimal.

In one embodiment, the process is conducted in a manner such that only a low percentage or close to zero amount of the total amount of hydrophobilizing agent present on the silica particles is present as a non-bonded, physically adsorbed component on the silica particles. Preferably, the amount of non-bonded, physically adsorbed hydrophobilizing agent is about 10% by weight, preferably not more than about 6% by weight, based on a total weight of the hydrophobilizing agent used in the process. In a more preferred embodiment, the amount of non-bonded hydrophobilizing agent present on the hydrophobized particles ranges from about 0% to about 5% based on a total weight of the hydrophobilizing agent used in the process.

In one embodiment, the hydrophobized particles may be prepared by an in-situ method. During the in-situ method, silica particles are reacted with hydroxy terminated silicone oil in mineral oil. The condensation reaction between the silica particles and the silicone oil takes place at a fairly low temperature (limited to the flash point of the diluent such as 100-120° C.). The hydrophobized particles may also be prepared using a dry roast method. During the dry roast method, the silica particles are reacted with the silicone oil (PDMS) (e.g. 100 cps) in a fluidized bed reactor to promote good contact between the silica particles and the silicone oil. The condensation reaction between the silica particles and the silicone oil takes place at about 260° C. Water is released during the condensation reaction as by-product. Once the hydrophilic silica particles become hydrophobic, silicone dioxide is suspended in the diluent such as mineral or silicone oil. Surfactants and wetting agents are then further added.

In a preferred embodiment, the hydrophobized silica particles are prepared by a continuous process using a high energy mill, e.g. a spiral jet mill or fluid energy mill. A spiral jet mill is mainly used for grinding particles to a specific particle size distribution. During the process, a fluid, typically compressed air, is injected into a grinding chamber of the spiral jet mill through nozzles that are tangentially aligned to create a vortex slightly smaller than the grinding ring itself. The air flowing through the nozzles reaches sonic velocities and causes comminution between particles in the grinding chamber. A natural classification process occurs from the fluid vortex, causing larger particles to be retained in the mill and smaller particles to exit. The high airflow to solid ratio and the turbulent conditions make the spiral jet mill a desirable processing equipment to complete surface reaction of particles by coating/mixing the reactants and heating them to quickly drive the reaction to completion.

In one embodiment, silica particles are added to the spiral jet mill while silanol terminated polydimethylsiloxane, PDMS, is being injected into a turbulent zone of the spiral jet mill simultaneously. The silica particles are uniformly coated with the PDMS which reacts with the hydroxyl groups on the surface of the particles to form hydrophobized silica particles. This process is desirable for producing hydrophobized particles since it can be run continuously and also combines the grinding and surface reaction into one processing step.

Another example of the present invention is a defoaming formulation. The defoaming formulation may include a deformer active according to one embodiment of the present disclosure.

The defoaming formulation may also contain other known components such as secondary defoaming agents, carriers, emulsifiers, coupling or stabilizing agents, or the like. The secondary defoaming agents may include fatty alcohols, fatty esters, silicones, and certain oil insoluble polymers. The carriers may include hydrocarbon oils or water. Examples of emulsifiers may include esters, ethoxylated products, sorbitan esters, silicones, and alcohol sulfates. Example of coupling agents may include red oil (oleic acid), hexylene glycol, fatty alcohols, naphthalene sulfonate, butyl alcohol, and formaldehyde. The defoaming formulation of the present invention may be used in any aqueous system in which a defoaming formulation is currently used.

While not intending to be limiting, and depending on the intended use of the deforming formulations, the defoaming formulation may include about 70 to 97% by weight of mineral oil, optionally, about 0.5 to about 3% by weight of surfactants, and about 3% to about 30%, preferably about 5% to about 20% by weight of hydrophobic defoamer actives.

Defoaming formulations comprising the defoamer actives of the invention may be utilized in many types of manufacturing processes to break macro- and microbubbles and defoam aqueous systems. Major industries in which the formulations may be used include, but are not limited to, the manufacture of paper, the manufacture of paints and coatings, water treatment facilities, the manufacture of textiles, and in oil fields. As will be understood by one skilled in the arts, the defoaming formulations of the invention may be used in such aqueous systems in conventional amounts depending on the intended use.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Hereinafter, the present invention will be described in more detail with reference to Examples. However, the scope of the present invention is not limited to the following Examples.

Examples

Materials

In the following examples, silicone oil and polydimethylsiloxane or PDMS are used interchangeably. Table 1 lists properties of the particles used such as median particle size (PS) D50, BET surface area (BET), and pore volume (PV).

TABLE 1

| Particle Identification | Material | PS D50 (μm) | BET ($m^2/g$) | PV (cc/g) |
|---|---|---|---|---|
| P-1 | Silica gel | 5.5 | 300 | 1.5 |
| P-2 | Silica gel | 6.0 | 700 | 0.4 |
| P-3 | Precipitated Silica | 12 | 35 | 0.23 |
| P-4 | Precipitated Silica | 35 | 35 | 0.23 |
| P-5 | Precipitated Silica | 13 | 150 | 0.63 |
| P-6 | Precipitated Silica | 4.5 | 109 | 0.66 |

In the Table, P-1 to P-5 are silica gel and precipitated silica samples with different particle sizes, BET surface areas and pore volumes. These silica gel or precipitated silicas are made from sodium silica and an acid such as sulfuric acid. The processes for the making of these particles are well known in the art, and most of these particles are commercially available from companies like W. R. Grace & Co., or Evonik, or other suppliers.

Table 2 lists properties of the PDMS used in the following examples. PDMS-1 and PDMS-2 are silanol terminated, and PDMS-3 is trimethyl silyl (TMS) terminated. PDMS-1 is available from Dow Corning (Midland, Mich.), PDMS-2 is available from Momentive Performance Materials (Waterford, N.Y.), and PDMS-3 is available from Wacker Chemie AG (Munich, Germany).

TABLE 2

| Identification | Silanol/ TMS Termini | (OH) content Wt % | Molar MW | Viscosity (cps) |
|---|---|---|---|---|
| PDMS-1 | Silanol | 2.5 | 1400 | 92 |
| PDMS-2 | Silanol | 0.23 | 15000 | 635 |
| PDMS-3 | TMS | None | 13600 | 376 |

Here below are structures of the two types of PDMS:

Silanol (OH) terminated PDMS

Trimethylsilyl (TMS) terminated PDMS

In Table 2, for both the silanol terminated PDMSs and the TMS terminated PDMS, the average molar molecular weights were provided by chemical suppliers. The average molar molecular weight could also be measured by a gel permeation chromatography (GPC) technique.

In Table 2, the viscosities of the silanol terminated PDMSs and the TMS terminated PDMS were provided by chemical suppliers. The viscosities of PDMS could also be measured using a Brookfield DV-II+Pro viscometer (available from Brookfield Engineering Laboratories, Inc., Middleboro, Mass.), with stands and associated spindle sets. The measurements were carried out at room temperature and the procedure (Single Point Viscosity method) was provided by Brookfield in its manual. The recommended procedure was similar to what is described in ASTM D2983.

In Table 2, the (OH) contents of the silanol terminated PDMSs were also provided by chemical suppliers. For the silanol terminated PDMS, the OH contents could also be calculated based on the following principle:
Each linker PDMS consists of two OH groups, and therefore the weight percent of OH groups on each chain is:

OH content %=2×17/$MW$ of the polymer×100%

For example, for a polymer chain of molar molecular weight of 15,000 Daltons, OH content %=2×17/15000=0.226%.

General Bonding Procedures

Bonding Procedure 1:
Both a 2 L round bottom flask and starting particles were oven dried, for example, at 120° C. for about 12 hours. In the flask was charged with the oven-dried starting particles. Then, a certain amount of PDMS was added into the flask using a pipette dropwise while the flask is frequently shaken so that the starting particles and the PDMS were mixed as homogeneously as possible. If the silicone oil was too viscous, a small amount of toluene was used to dissolve the PDMS, and then the dissolved PDMS was added. The mixture of the PDMS and the particles was allowed to roll on a rotavap at room temperature for at least about 5 hours to about 12 hours. Then, the mixture of the PDMS and the particles was transferred into a crystalline dish, which was then placed in a fume hood for a few hours to allow toluene, if used, to evaporate. Finally, the crystalline dish containing the mixture of the PDMS and the particles was placed in an oven and baked at 120° C. for about 12 hours.

Bonding Procedure 2:
Milling/grinding method: a certain amount of particles and a certain amount of PDMS were placed in a mortar pestle, and the mixture is grinded manually for 30 minutes to 1 hour. This process could be replaced with milling, for example, in a clean ball mill. Then, the mixture was transferred into a crystalline dish, which was then placed in an oven and baked at 120° C. for about 12 hours.

Bonding Procedure 3:
A 10" spiral jet mill with eight 0.011" grind holes was used. The grinding chamber of the spiral jet mill was modified so that a 0.8 mm nozzle could be inserted from outside to inside of the grinding ring wall. This nozzle was connected to a metering pump which is used to meter in the PDMS.

Specifically, the bonding procedure includes the following steps. First, the mill superheater was brought up to a temperature, for example, in a range from 300 F to 340 F. An Acrison Loss-in-weight feeder was filled with the particles to be milled. The feeder was set to a constant rate of 40 lb/hr of particles. During the bonding, the temperature of the mill superheater was constantly being adjusted by a control system to keep the mill outlet temperature between 300-340 F, and the mill grinding pressure and injection pressure were controlled at 18 and 80 psig, respectively. Then, a pre-calibrated metering pump was turned on to inject PDMS through the nozzle into the milling chamber. As such, the particles and PDMS were being added to the mill at the same time. This process continued until a desired amount of milled-hydrophobic product is produced.

Testing Methods

The particle sizes were determined by a light scattering method using a Malvern Mastersizer 2000 or 3000 available from Malvern Instruments Ltd. per ASTM B822-10.

The "BET surface area" of the particles was measured by the Brunauer Emmet Teller nitrogen adsorption method (Brunauer et al, J. Am. Chem. Soc., 1938, 60(2), 309-319).

The carbon content of the particles was measured using a LECO Carbon Analyzer SC-632 available from LECO Corp.

Figure 1:
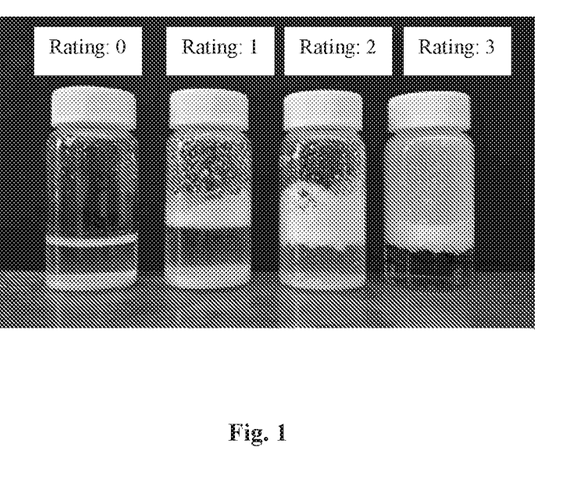
FIG. 1 shows results of a hydrophobicity test of hydrophobized particles according to one embodiment of the present invention.

Hydrophobicity Test
The hydrophobicity of the hydrophobized particles was measured by a floatability method. The hydrophobicity test was performed by placing dried hydrophobic particles into a mixture solvent of methanol and water with a volume ratio of 60%/40%. Specifically, about 0.25 g of hydrophobized particles were placed in a small, 20 ml vial containing about 6 ml of the mixture solvent. After some vigorous shaking (~20 times), the hydrophobized particles were fully mixed with the mixture solvent. After 30 minutes, the floating properties of the hydrophobized particles were visually examined with a rating of 0 (nothing floating, all settled at the bottom of the vial), 1 (about 50% floating), 2 (about 75% floating), and 3 (all particles floating, and nothing settled at the bottom of the vial), as shown in FIG. 1.

A rating of 3 or with certain approximation (for example, 95% of the particles are floating in the test mixture) indicated that the hydrophobized particles had the highest hydrophobicity and were not wettable in the mixture solvent. This was the highest possible rating and is preferred for the performance of the hydrophobized particles.

Free Silicone Evaluation
A percentage of chemically bonded PDMS vs. physically adsorbed PDMS was evaluated using a free silicone evaluation method. Adsorbed PMDS could be desorbed and become free, and these were detrimental to the system and environment as described in the embodiments. The method of evaluating an amount of free PDMS included the following steps:

1). During a washing step, the hydrophobized particles were extensively washed with toluene. After 4 times of washing, the hydrophobized particles were dried at 110° C. for 4 hours.

2). Elemental carbon analysis was carried out on the hydrophobized particles before and after the washing step by a combustion method with a LECO instrument. The results of the elemental carbon analysis on hydrophobized particles after the washing step were compared against those of the hydrophobized particles before the washing step, that was, the unwashed, hydrophobized particles.

3). A difference between the carbon values on the hydrophobized particles before and after the washing step is calculated. This difference was an indication of the amount of physically adsorbed PDMS. A value of zero or close to zero suggests 100% or close to 100% PMDS were chemically bonded.

Reaction Kinetics Study

The reaction at a certain temperature was monitored against time such as minutes to hours. Aliquots are taken at certain times, and samples were washed with toluene as described in the free silicone evaluation. Then, the samples were evaluated regarding C % and percentage of reaction completion.

Caustic Treatment of Particles

To study the influence of surface pH of silica particles, the silica particles having a surface pH close to neutral (e.g. SM850C or P-3/P-3 (large) below) were raised. To carry out this procedure, the particles were slurried in water and treated with 1M NaOH solution until a targeted pH was reached. Then, the particles were filtered and dried for PDMS bonding study.

EXAMPLES

Examples 1-4

Influence of Surface Area of Silica Particles on Hydrophobicity of Hydrophobized Particles Silica particles P-1, P-2, P-3 and P-5 were treated with PDMS-1 using bonding procedure 1. 10% by weight of PDMS based on a total weight of the silica particles and the PDMS-1 was used. Hydrophobicity of the hydrophobized silica particles was measured, as shown in Table 3 below.

TABLE 3

| Example Number | Choice of Particles | Choice of PDMS | Bonding Method | Amount of PDMS used (w/w) | Hydrophobicity rating |
|---|---|---|---|---|---|
| 1 | P-1 | PDMS-1 | Bonding procedure 1 | 20% | 0 |
| 2 | P-2 | PDMS-1 | Bonding procedure 1 | 20% | 0 |
| 3 | P-3 | PDMS-1 | Bonding procedure 1 | 10% | 2 |
| 4 | P-5 | PDMS-1 | Bonding procedure 1 | 10% | 0 |

As shown in Table 3, precipitated silica particles P-3 treated with PDMS-1 achieved hydrophobicity results of 2 while the other silica particles P-1, P-2, and P-3 treated with PDMS-1 had poor hydrophobicity of 0. Thus, these results showed that the particles having a smaller surface area had unexpectedly significantly better hydrophobicity performance than the particles having a larger surface area.

Examples 5-7

Influence of Surface pH of Silica Particles on Reaction Kinetics

Figure 2:
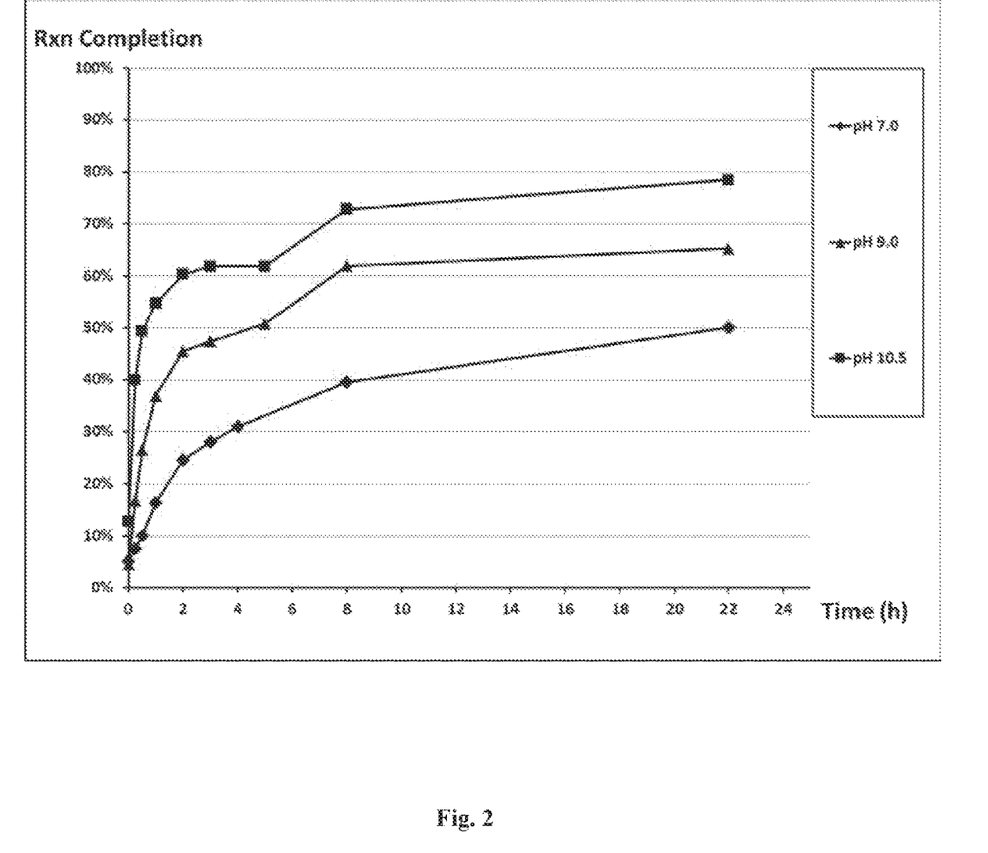
FIG. 2 shows influence of surface pH of silica particles on reaction kinetics according to one embodiment of the present invention.

Silica particles P-3 and silicone sample PDMS-1 were chosen to study the pH influence on the reaction kinetics at 85° C. Prior to the study, the surface pH of the silica particles were adjusted to a target pH: 7.0 (Example 5), 9.0 (Example 6) and 10.5 (Example 7), respectively. The reaction completion was studied at 0.25, 0.5, 1, 2, 3, 5, 8 and 22 hours and the percentages of reaction completion are plotted against time as shown in FIG. 2. Bonding procedure 1 was used for the bonding. 10 by weight of PDMS based on a total weight of the silica particles and the PDMS-1 was used.

As shown in FIG. 2, Examples 5-7 showed importance of surface pH of the silica particles on the reaction completion. A higher surface pH was preferred for the reaction to complete in a shorter time.

Examples 8-11

Lower Amount of PDMS Sufficient for Hydrophobic Performance of Hydrophobized Particles Comprising Silica Particles Having a Smaller Surface Area From all the examples above, a minimal amount of 10% of PDMS had been used for the bonding. From particles with the 10% bonded materials, the C % content was typically around 2.7-2.9. However, for particles having very low surface area (less than 40 $m^2/g$) such as P-3 and P4, a lower amount of PDMS could be used instead to still afford a high rating of hydrophobicity.

In this study, about 50 grams of silica particles P-3 were hydrophobized with about 8.6 g of 1M NaOH to bring the surface pH of the particles to around 10. The silica particles were then dried and split into 2 aliquots.

The two sets of the pH adjusted silica particles were treated with 5.0 wt % and 5.5 wt % PDMS-2 according to bonding procedure 2, respectively. Each of the two sets of the hydrophobized silica particles was split into two sets again to obtain 4 Examples in total, which are Examples 8-11, as shown in Table 4. Example 8 and 10 were directly dried at 120° C. for about 12 hours. Examples 9 and 11 were ground with a ball mill, and then dried at 120° C. for about 12 hours. A small sample from each of Examples 8-11 were washed 4 times with toluene, and then dried at 120° C. for about 12 hours. The four samples, both washed and unwashed with toluene, were evaluated for C % and hydrophobicity test, as shown in Table 4.

TABLE 4

| Example # | Description | | C % Unwashed | Washed | Rxn Completion (%) | Hydrophobicity Rating |
|---|---|---|---|---|---|---|
| 8 | 5% PDMS-2 | Unmilled | 1.59 | 1.57 | 98.7 | 3 |
| 9 | 5% PDMS-2 | Milled | 1.57 | 1.58 | 100 | 3 |
| 10 | 5.5% PDMS-2 | Unmilled | 1.69 | 1.68 | 99.4 | 3 |
| 11 | 5.5% PDMS-2 | Milled | 1.64 | 1.63 | 99.4 | 3 |

As shown in Table 4, the carbon contents of all Examples 8-10 were small while the reaction completion and the hydrophobicity rating of the hydrophobized silica particles were very high. The silica particles having a very low BET surface area (~35 $m^2/g$) only required about 5 wt % of PDMS based on the weight of the silica particles to produce hydrophobized silica particles having equal or better hydrophobicity performance than the silica particles having a relatively large surface area. Also the amount of the free, physically adsorbed PDMS was close to zero.

Examples 12 and 13

Effect of Molecular Weight of PDMS on Reaction Kinetics

In these examples, silica particles P-3 were used and, prior to the bonding, the surface pH of the silica particles P-3 were raised to about 10 with 1M NaOH as described previously. After drying, the silica particles are treated with 5% of PDMS-1 and PDMS-2 respectively using bonding procedure 1. After heating at 120° C. for 12 hours, the conversion completion was evaluated for both samples. The results are shown in Table 5.

TABLE 5

| Example # | Silica | PDMS | Rxn Completion (%) |
|---|---|---|---|
| 12 | P-3 | PDMS-1 | 60% |
| 13 | P-3 | PDMS-2 | 95% |

As shown in Table 5, under the same reaction conditions, the lower molecular weight PDMS had much lower reaction conversions.

Examples 14 and 15

Effect of Silanol Terminated PDMS on Reaction Kinetics

In these examples, the reaction kinetics of TMS terminated PDMS and silanol terminated PMDS were compared. In both cases, silica particles P-6 were used for these experiments. Silica particles P-6 had a surface pH of about 8.3, lower than 10 as described in the embodiments. But the reactivity of the sample particle towards two different types of PDMS still showed significant difference. Silica particles P-6 were dried before bonding study. The particles were treated with 10 w/w % of PDMS-2 and PDMS-3 and the reaction kinetics at 120° were compared. The following Table 6 gives the comparison results for the conversion at 1, 2, 3, 4, 5 hours:

TABLE 6

| Example # | Particle # | PDMS Choice | Reaction Completion (%) | | | | |
|---|---|---|---|---|---|---|---|
| | | | 1 hour | 2 hours | 3 hours | 4 hours | 5 hours |
| 14 | P-6 | PDMS-2 | 100% | 100% | 100% | 100% | 100% |
| 5 | P-6 | PDMS-3 | 29% | 81% | 87% | 93% | 100% |

As can be seen, under the same conditions, PDMS-3 (with TMS terminal), had much slower reaction kinetics than PDMS-2 (with OH terminal), even though the two PDMS had similar molecular weights.

Example 16

Spiral Jet Mill Production of Hydrophobilized Particles

The use of a 10 inch spiral jet mill or fluid energy mill as described in bonding procedure 3 is demonstrated in Example 16. The following paragraph lists the running conditions, and Table 7 shows results of the bonding completion and hydrophobic performance rating.

The running conditions were as follows: particle feed rate was about 40 lb/hr; additive feed rate was about 45 g/min; superheater temperature was about 1000 F; injection temperature was about 350 F; injection pressure was about 80 psi; grind temperature was about 612 F; grind pressure was about 18 psi; outlet temperature mill was about 320 F; and baghouse temperature was about 300 F. The following table 5 shows results of bonding completion and hydrophobic performance rating.

TABLE 7

| Example # | Particles | PDMS | PDMS ratio | Incoming APS (μm) | Product APS (μm) | Conversion % | Hydrophobicity Rating |
|---|---|---|---|---|---|---|---|
| 16 | P-4 | PDMS-2 | 5% | 30.1 | 9.1 | 89% | 2 |

As shown in Table 7, the use of spiral jet mill or fluid energy mill was feasible for the production of hydrophobic particles. The reaction could be accomplished with some reduction of average particle size (APS), which could be adjusted with different milling conditions to satisfy the particle size needs. Most importantly, this was a continuous process with the potential of large scale commercial production.

The invention claimed is:

1. A defoamer active, comprising:
   hydrophobized silica particles having a carbon content of not more than 3.0%, wherein the hydrophobized particles comprise silica particles having a BET surface area of less than about 60 m2/g, a surface pH of at least about 10, a pore volume of about 0.25 cc/g or less, and a median particle size ranging from about 2 μm to about 50 μm,
   wherein the hydrophobized silica particles comprise a hydrophobilizing agent covalently bonded to the surface thereof in an amount of not more than 6% by weight based on a total weight of the hydrophobized silica particles, and
   wherein the hydrophobilizing agent is a silanol terminated polydimethylsiloxane having a content of hydroxyl group ranging from about 0.10% by weight to about 2.0% by weight and an average molar mass of at least 3,000 Da.

2. The defoamer active according to claim 1, wherein the carbon content of the hydrophobized silica particles is not more than 2.0%.

3. The defoamer active according to claim 1, wherein the median particle size of the hydrophobized silica particles ranges from about 2 μm to about 15 μm.

4. The defoamer active according to claim 1, wherein the surface pH of the silica particles is at least about 10.5.

5. The defoamer active according to claim 1, wherein the polydimethylsiloxane has an average molar mass of at least 5,000 Da.

6. The defoamer active according to claim 1, wherein the silanol terminated polydimethylsiloxane has a viscosity of at least 3600 centipoises.

7. The defoamer active according to claim 1, wherein at least 90% by weight of the hydrophobilizing agent on the surface of the silica is covalently bonded to the silica particles.

8. The defoamer active according to claim 7, wherein at least 95% by weight of the hydrophobilizing agent is covalently bonded to the silica particles.

9. The defoamer active according to claim 1, wherein the hydrophobized silica particles have hydrophobicity rating of at least 2, as measured according to a floatability method in a mixture solvent of methanol and water with a volume ratio of 60% to 40%.

10. The defoamer active according to claim 1, wherein the defoamer active is prepared by a continuous spiral jet mill process.

11. A defoaming formulation, comprising the deformer active according to claim 1.

12. A coating formulation, comprising the defoaming formulation according to claim 11.

13. A method of forming a defoamer active, comprising:
   milling and bonding silica particles with a hydrophobilizing agent using a spiral jet mill or fluid energy mill to obtain hydrophobized silica particles,
   wherein the silica particles have a BET surface area of less than about 60 m2/g, a surface pH of at least about 10, a pore volume of about 0.25 cc/g or less, and a median particle size ranging from about 2 µm to about 50 µm, and a carbon content of the hydrophobized silica particles is not more than 3%, and
   wherein the hydrophobilizing agent is a silanol terminated polydimethylsiloxane having a content of hydroxyl group ranging from about 0.10% by weight to about 2.0% by weight and an average molar mass of at least 3,000 Da; and
   wherein the silanol terminated polydimethylsiloxane is present in the hydrophobized silica particles in an amount of not more than 6% by weight based on a total weight of the hydrophobized silica particles.

14. The method of forming a defoamer active according to claim 13, wherein milling and bonding the silica particles with the hydrophobilizing agent using the spiral jet mill or fluid energy mill to obtain the hydrophobized silica particles comprises:
   adding the silica particles and the hydrophobilizing agent into the spiral jet mill or fluid energy mill; and
   milling and heating the silica particles and the hydrophobilizing agent in the spiral jet mill or fluid energy mill to form the hydrophobized silica particles.

15. The method of forming a defoamer active according to claim 14, wherein the hydrophobilizing agent is in an amount of not more than 6% by weight based on the total weight of the hydrophobized silica particles.

* * * * *